Patented Aug. 11, 1942

2,292,950

UNITED STATES PATENT OFFICE 2,292,950

CATALYTIC OXIDATION

Donald J. Loder and Paul L. Salzberg, Wilmington, Del., assignors to E. I. du Pont de Nemours & Company, Wilmington, Del., a corporation of Delaware No Drawing. Application April 22, 1939, Serial No. 269,466

6 Claims. (Cl. 260—406)

This invention relates to oxidation of fatty materials, and more specifically to a process for the liquid-phase catalytic oxidation by an oxygen-containing gas of long-chain hydroxylated and unsaturated fatty acids and their esters to dicarboxylic and hydroxy acids.

It is an object of the present invention to provide a process for the preparation of aliphatic acids having a functional group in the terminal position by controlled catalytic liquid-phase oxidation of long chain unsaturated fatty acids and hydroxy fatty acids and esters of said acids. A further and more specific object is to convert these fatty materials predominantly to hydroxy and dicarboxylic acids by preferential attack at the substituted position or at the position of unsaturation. Other objects will appear hereinafter.

These objects are accomplished by the following invention which comprises blowing with an oxygen-bearing gas the hydroxylated or unsaturated fatty materials, at elevated temperatures and superatmospheric pressures preferably in solution and in the presence of a catalyst and a co-oxidizer. When oxidized under these conditions with an oxygen-containing gas, for example, oxygen or air or air enriched with oxygen, simultaneous oxidation and chain cleavage occurs to yield aliphatic dibasic acids of the general formula $HO_2C-(CH_2)_x-CO_2H$ and aliphatic monohydroxy monocarboxylic acids of the general formula $HO-(CH_2)_x-CO_2H$ wherein $x$ is a finite integer greater than one.

In this manner it is possible to oxidize hydroxylated and unsaturated fatty acids and their esters, such as oleic and 12-hydroxystearic acid, and the like, with production of aliphatic dibasic and hydroxy acids such as azelaic, suberic, dodecanedioic, and 11-hydroxyundecanoic acid.

Example 1

To a solution of 300 g. of 12-hydroxystearic acid in 120 cc. of glacial acetic acid are added 5 g. of methyl ethyl ketone and 0.1 g. of cobalt acetate. The hot solution is then charged into an unpacked vertically mounted corrosion-resistant tube of 1000 cc. capacity, provided with a suitably valved gas outlet and inlet line in top and bottom, respectively. The solution is then heated to 145° C., and air is introduced through the inlet line at the base of the tube until the pressure reaches 40 atmospheres. Air is then bubbled through the solution for 4.0 hours at the rate of 225 liters per hour, the pressure being maintained at 40 atmospheres and the temperature at 142°–155° C. The progress of the oxidation is followed by periodic analyses of the gases which have previously passed through a condenser and a series of dry ice traps to remove any volatile products. The total weight of product is 453 g. After distillation of the acetic acid, the residue is saponified to separate acids from any neutral products; the free acids are subsequently converted to the ethyl esters and fractionally distillated. A 30% yield of the ethyl ester of 11-hydroxyundecanoic acid, B. P. 158–168° C./2–3 mm., and a 10% yield of a mixture of the diethyl esters of dodecanedioic and undecanedioic acids, B. P. 152–156° C./2 mm., was obtained by this reaction.

Example 2

A hot solution containing 312 g. of 12-hydroxystearin, 5 g. of methyl ethyl ketone, 120 g. of glacial acetic acid, and 0.1 g. of cobalt acetate charged into the aforementioned reaction vessel is heated to 135° C. and the pressure elevated to 30 atmospheres. Air is then bubbled through the solution for 4.6 hours at the rate of 250 liters per hour, the temperature being maintained at 127°–135° C. at this pressure. The free acids obtained by saponification are separated by preparation of the nitriles and distillation. Several nitriles are isolated in amounts corresponding to 18% yield of 11-hydroxyundecanoic acid and a 15% yield of dodecanedioic acid mixed with undecanedioic acid.

Example 3

A solution of 282 g. of oleic acid in 120 cc. of glacial acetic acid containing 5 g. of methyl ethyl ketone and 0.1 g. of cobalt acetate is charged into the reaction vessel. At a pressure of 30–40 atmospheres and a temperature of 118°–128° C. air is bubbled through for 4.0 hours at a rate of 240 liters per hour. The total weight of product, including acetic acid, is 444.0 g. On treating the product according to the procedure described in Example 1 there is obtained a mixture of free acids which are converted to ethyl esters and fractionally distilled. The major portion of the oleic acid (77%) reacts to yield a mixture of azelaic and suberic acids, polymerized oleic acid, and nonanoic acid. The azelaic acid is easily identified by the boiling point of the ethyl ester and the mixed melting point of the free acid with a known sample.

Although in the foregoing examples there have been indicated certain definite conditions of temperature, pressure, concentration, reaction times, space velocities, and the like, it is to be understood that these values may be varied somewhat within the indicated scope of the invention.

Thus, while the process is operable at temperatures ranging between about 110° C. and about 170° C., generally speaking temperatures in the more restricted range of 110° to 150° C. are preferred, because within this range optimum yields of desired products are obtained.

In general, oxidation at low temperatures is facilitated by conducting the reaction in the presence of a catalyst, a solvent, or a co-oxidizer. These can be used individually or in various combinations, but the best results are obtained when all three are employed.

For example, the yields of dibasic and hydroxy acids produced according to this invention may be considerably increased by carrying on the oxidation in the presence of an oxidation catalyst, such specifically as metallic elements or metallic ions selected from the group which would develop, under the conditions used, a standard oxidation-reduction potential in the range between −0.04 and about −1.80 referred to the hydrogen-hydrogen ion couple as zero. (Latimer and Hildebrand, "Reference Book of Inorganic Chemistry," pp. 367–369). For example, we may use such metals in the finely divided metallic state or as organic or inorganic salts or oxides, including such specific metals as cerium, cobalt, vanadium, copper, silver, manganese, and uranium, with or without inorganic acids such as nitric, phosphoric, and hydrochloric acids or mixtures of any two or more of these substances. As specific catalysts under the above description, there may be employed vanadium, cerium, and cobalt chloride, manganese acetate, barium or cobalt permanganate, sodium cobaltinitrite or mixtures of two or more of such compounds. In addition to the oxidation catalysts, promoters such as the alkali and alkaline earth metals may also be employed if desired, such for example as barium, magnesium, and potassium acetates, butyrates, propionates, and the like.

It has also been found that the yields of aliphatic dibasic and hydroxy acids are increased if the oxidation is carried on in the presence of a solvent for the fatty substance. Various liquids inert to oxidation under the conditions employed, and capable of dissolving the fatty substances such as carbon tetrachloride may be used, but we prefer to use as solvent an organic acid, such as acetic, propionic, butyric, trimethylacetic, and isobutyric, or aromatic or hydroxy acids, or their derivatives. The proportions of these acids, based upon weight per cent of fatty substance being oxidized, may be varied from 1 to 99% by weight although it is preferred to utilize from 20 to 50%. In addition, it has been found that the yields and the efficiency of the process may be even further improved by carrying on the oxidation in the presence of one or more "co-oxidizers," which term we employ herein to designate substances capable either of acting as oxygen carriers and therefore continuously furnishing oxygen in some highly reactive state, such for example as is found in atomic oxygen or oxygen-containing radicals which then oxidize the fatty substance directly, or of initially oxidizing the fatty substance to such oxygen carriers which then function as described. For example, there may be employed inorganic peroxides, such as sodium or hydrogen peroxide; organic peroxides, such as benzoyl peroxide; peracids, such as peracetic and perbenzoic acids; the aldehydes, such as acetaldehyde, propionaldehyde, and isobutyraldehyde; ketones, such as acetone, methyl ethyl ketone, diethylketone, and cyclohexanone; ethers, such as diisopropyl, diethyl, and diamyl ethers; olefins, such as cyclohexene and octylene; and in fact any organic compound which tends to form peroxide bodies under the reaction conditions.

The co-oxidizer may be added to the reactants as described or continuously during the oxidation or both; or, if preferred, the oxidation may be begun at a temperature and pressure at which partial oxidation products, capable of being oxidized to or acting as oxygen carriers are formed, and the reaction may then proceed at relatively low temperatures. The constant maintenance of a concentration of co-oxidizer is important, however, and therefore in general the co-oxidizer is deliberately added to the reactants. The proportions of co-oxidizers which are desirable according to this invention range from about 0.1 to about 10% based upon the weight of fatty substance being treated. Although primarily applicable to ketones such as acetone, methyl ethyl ketone, and cyclohexanone, or mixtures thereof, this range describes satisfactorily the amount of other co-oxidizers which are suitable according to our invention.

While the desired results are obtained by operation at ordinary pressures, because of the decrease in reaction time, we prefer to use elevated pressures ranging from about 25 to about 50 atmospheres. Higher pressures may be used, if desired.

Although the process as described in the examples involves passage of the oxidizing gases through a body of liquid, it is to be understood that other means of assuring the desired liquid gas contact may be employed, as, for example, passage of liquid and gas co-current or countercurrent through a tube or tower, which may be supplied with plates, packing, or other devices, for increasing contact.

The process of this invention is applicable generally to the oxidation of fatty substances of the group consisting of hydroxylated and unsaturated fatty acids and their esters, said acids containing at least 8 carbon atoms. Instead of 12-hydroxystearic or oleic acids, for example, we may use such acids as erucic, brassidic, ricinoleic, hypogaeic, undecylenic, and hydroxy palmitic acid and their monohydric or polyhydric alcohol esters. By the term "esters" is meant not only the synthetically prepared esters but also the mixed esters such as the naturally occurring glycerides, e. g., olein and castor oil. Similarly, in place of castor oil, hydrogenated castor oil may be used. In general, the products of this invention are of interest as chemical intermediates. They are particularly suitable for the preparation of synthetic resins, plasticizers, and wax blending agents. Other uses will be readily apparent to those skilled in the art.

Various changes may be made in the methods and details of the present invention without departing therefrom or sacrificing the advantages thereof.

We claim:

1. A process for the preparation of a saturated polycarboxylic acid from non-drying and semi-drying hydroxylated fatty acids and unsaturated fatty acids of more than 8 carbon atoms and their esters which comprises simultaneously oxidizing and cleaving the chain of said compounds by subjecting them to oxidation by means of an oxygen-containing gas in the presence of an oxidation catalyst and in the presence of a solvent for the substance to be oxidized.

2. A process for the preparation of a saturated polycarboxylic acid from non-drying and semi-drying hydroxylated fatty acids and unsaturated fatty acids of more than 8 carbon atoms and their esters which comprises simultaneously oxidizing and cleaving the chain of said compounds by subjecting them to oxidation by means of an oxygen-containing gas in the presence of an oxidation catalyst, a solvent for the substance to be oxidized and a co-oxidizer.

3. A process for the preparation of a saturated polycarboxylic acid from non-drying and semi-drying hydroxylated fatty acids and unsaturated fatty acids of more than 8 carbon atoms and their esters which comprises simultaneously oxidizing and cleaving the chain of said compounds by subjecting them to oxidation, in the liquid phase, by means of an oxygen-containing gas at a temperature in the range of 110° to 170° C. and in the presence of an oxidation catalyst.

4. A process for the preparation of a saturated polycarboxylic acid from non-drying and semi-drying hydroxylated fatty acids and unsaturated fatty acids of more than 8 carbon atoms and their esters which comprises simultaneously oxidizing and cleaving the chain of said compounds by subjecting them to oxidation by means of an oxygen-containing gas, at a temperature in the range of 110° to 170° C., in the presence of a solvent for the substance to be oxidized, a co-oxidizer, and an oxidation catalyst selected from the group consisting of metallic elements and metallic ions which would develop, under the conditions of the reaction, a standard oxidation-reduction potential in the range between $-0.04$ and $-1.80$, referred to the hydrogen-hydrogen ion couple as zero.

5. A process for the preparation of a saturated polycarboxylic acid from non-drying and semi-drying hydroxylated fatty acids and unsaturated fatty acids of more than 8 carbon atoms and their esters which comprises simultaneously oxidizing and cleaving the chain of said compounds by subjecting them to oxidation by means of an oxygen-containing gas, at a temperature in the range of 110° to 170° C., in the presence of an organic acid solvent for the substance to be oxidized, a ketone, and an oxidation catalyst selected from the group consisting of metallic elements and metallic ions which would develop, under the conditions of the reaction, a standard oxidation-reduction potential in the range between $-0.04$ and $-1.80$, referred to the hydrogen-hydrogen ion couple as zero.

6. A process for the preparation of a saturated polycarboxylic acid from non-drying and semi-drying hydroxylated fatty acids and unsaturated fatty acids of more than 8 carbon atoms and their esters which comprises simultaneously oxidizing and cleaving the chain of said compounds by subjecting them to oxidation by means of an oxygen-containing gas, at a temperature in the range of 110° to 150° C., in the presence of an organic acid solvent for the substance to be oxidized, a ketone, and an oxidation catalyst selected from the group consisting of metallic elements and metallic ions which would develop, under the conditions of the reaction, a standard oxidation-reduction potential in the range between $-0.04$ and $-1.80$, referred to the hydrogen-hydrogen ion couple as zero.

PAUL L. SALZBERG.
DONALD J. LODER.